United States Patent [19]

Inaba et al.

[11] 4,299,529
[45] Nov. 10, 1981

[54] AUTOMATED DEVICE

[75] Inventors: Hajimu Inaba, Hino; Shigemi Inagaki, Musashino, both of Japan

[73] Assignee: Fujitsu Fanuc Limited, Tokyo, Japan

[21] Appl. No.: 5,800

[22] Filed: Jan. 23, 1979

[30] Foreign Application Priority Data

Jan. 31, 1978 [JP] Japan ............................... 53-9662[U]

[51] Int. Cl.³ .............................................. B25J 9/00
[52] U.S. Cl. .................... 414/590; 414/744 A
[58] Field of Search ................... 414/730, 732, 735, 2, 414/7, 590, 597, 716, 733, 753, 744 R; 403/4, 91, 84, 85, 119

[56] References Cited

U.S. PATENT DOCUMENTS

| 650,882 | 6/1900 | Walker | 403/84 |
| 3,739,923 | 6/1973 | Totsuka | 414/730 X |
| 3,765,474 | 10/1973 | Burton | 414/733 X |
| 3,845,284 | 10/1974 | Taguchi | 414/730 X |

FOREIGN PATENT DOCUMENTS

| 1255924 | 2/1961 | France | 414/7 |
| 53-57663 | 5/1978 | Japan | 414/732 |

Primary Examiner—Trygve M. Blix
Assistant Examiner—Terrance L. Siemens
Attorney, Agent, or Firm—Armstrong, Nikaido, Marmelstein & Kubovcik

[57] ABSTRACT

An automated device comprising an arm, a wrist which is rotatably held by the arm at predetermined angles and a hand which is rotatably held by the wrist, wherein the wrist includes an apparatus for varying the angle of the axis of the wrist with respect to the axis of the arm, and the varying apparatus has a device for adjusting the angle. In the above device, the wrist may be bent in all directions.

3 Claims, 4 Drawing Figures

AUTOMATED DEVICE

The present invention relates to an automated machining system, and more particularly to an automated device used in loading and unloading of workpieces, tool changing disposing of chips, etc., for a Computer-aided Numerically-Controlled machine tool system.

The Computer-aided Numerically-Controlled machine tool system (hereinafter referred to as a CNC machine tool system) includes a robot, i.e., an automated device, and also includes various kinds of tool machines such as CNC lathes, tables for workpieces, racks for tools, etc., located in the periphery of the automated device. The automated device carries out loading and unloading of workpieces, carrying of workpieces and tools, disposing of chips, etc. The automated device basically has a hand provided with at least two fingers for gripping workpieces or tools; a wrist for holding the hand rotatably; and an arm to which the wrist is connected. The hand is rotatable with respect to the axis of the wrist. The arm is capable of being stretched in and out. Furthermore, it is required that the hand can grip workpieces or tools located at any position. For this reason, the angle between the axis of the hand and the axis of the arm should be variable. In order to obtain the variability of the angle, the wrist for connecting the hand and the arm should be bent in all directions.

In an automated device of the prior art the wrist is bent in three dimensions by using a very large number of gears, together with supporting shafts and bearings. The gears are driven by electric motors such as servomotors which require a control unit. As a result of the automated device being provided with the gears, the electric motors, the control unit, etc., the bending functional part of the device is of a relatively large size and of a complex mechanical and electrical construction. Furthermore, the cost of the device becomes relatively high.

Therefore, it is the principal object of the present invention to provide an automated device including a wrist capable of being bent manually which requires no control unit for effecting the bending function. Accordingly, the bending functional part of the automated device is of a construction which is relatively small, simple and low in cost.

The present invention will be more apparent from the ensuing description with reference to the accompanying drawings wherein.

Figure 1:
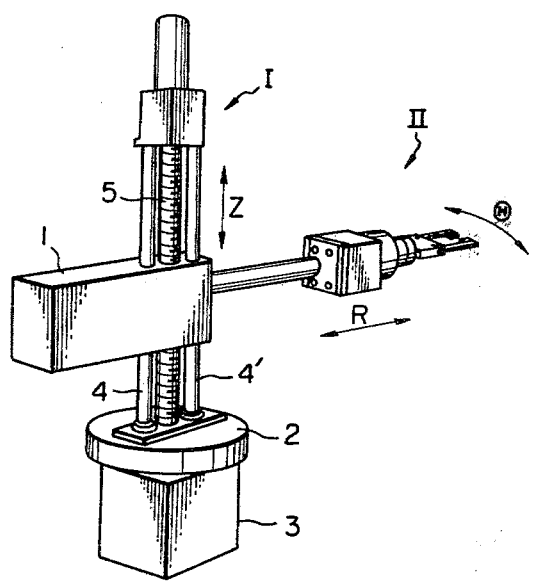
FIG. 1 is a perspective view showing an automated device according to the present invention.

FIG. 1 is a perspective view showing an automated device according to the present invention. In FIG. 1, the automated device is comprised of a main body I and a gripping part II. The gripping part II is movable along three directions R, ⊕ and Z (see arrows R, ⊕ and Z). The gripping part II is moved back and forth along the direction R by a motor contained in a driving unit 1. The gripping part II together with a turning table 2 is moved to the right and to the left along the direction ⊕ by a motor contained in a driving unit 3. Furthermore, the gripping part II is moved up and down along the direction Z by a motor contained in the driving unit 1, with the help of two shafts 4 and 4' and a lead screw 5. Thus, the gripping part II can be moved along three directions. The members of the gripping part II will be described below.

Figure 2A:
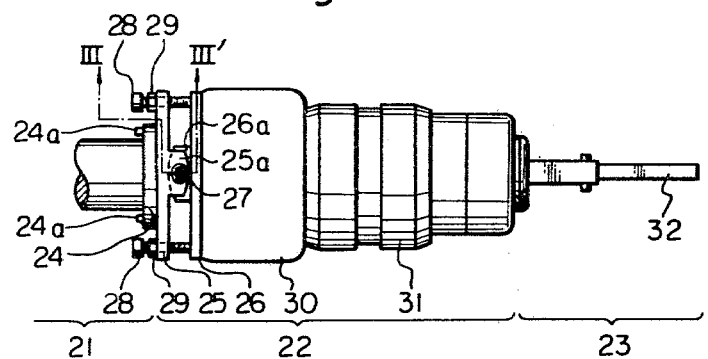
FIG. 2A is a detailed side view of the gripping part II of the automated device shown in FIG. 1.

FIG. 2A is a detailed side view of the gripping part II of the automated device shown in FIG. 1. In FIG. 2A, the gripping part II is composed of an arm 21, a wrist 22 and a hand 23. The arm 21 is provided with a mounting member 24 for connecting the wrist 22 to the arm 21. The wrist 22 is provided with two mounting plates 25 and 26. The mounting plate 25 is fixed to the mounting member 24 by bolts 24a. The mounting plate 25 is connected to the mounting plate 26 wherein the bent portions 25a of the mounting plate 25 and the salient portions 26a of the mounting plate 26 are rotatably connected by a joint pin 27 Therefore, the mounting plates 25 and 26 are rotatable with respect to the axis of the joint pin 27. The angle between the mounting plates 25 and 26 is adjusted by using four bolts 28 each of which has a nut 29 for locking the bolt. Thus, the angle can be adjusted to any value within a predetermined range. The wrist is also provided with a mounting member 30 to which the mounting plate 26 is fixed, and a rotary actuator 31 for rotating the hand 23. The hand 23 has two fingers 32 each of which has a nail (not shown) for gripping workpieces or tools (not shown) directly. Thus, the hand 23 can be rotated with respect to the axis of the wrist 22 by the rotary actuator 31. Also, the wrist 22 can be bent with respect to the axis of the arm 21. Furthermore, the wrist 22 can be rotated with respect to the axis of the arm 21 at predetermined intervals, wherein the bolts 24a are loosened and the wrist 22 is rotated at an angle such as 90 degrees. Finally, the bolts 24a are tightened to the mounting member 24.

Figure 2B:
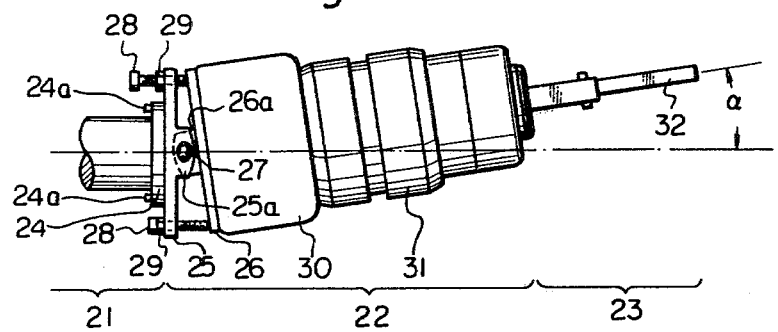
FIG. 2B is a view similar to FIG. 2A showing part II as it is bent.

FIG. 2B is a view similar to FIG. 2A showing the gripping part II as it is bent. In FIG. 2B, two of the bolts 28 are tightened to the mounting plate 25, while the others are loosened from the plate 25. As a result, the axis of the wrist 22 is set at an angle $\alpha$ to the axis of the arm 21. Thus, the wrist 22 can be bent upward and downward. When the wrist 22 is required to be bent to the right or to the left, all of the bolts 24a are loosened. After that, the wrist 22 is rotated at a predetermind angle such as 90 degrees. Then, the bolts 24a are tightened to the mounting plate 25 so that the arm 21 and the wrist 22 are fixed to each other. Next, the bolts 28 are adjusted to any desired position. Thus, the wrist 22 can be bent to the right and to the left.

Figure 3:
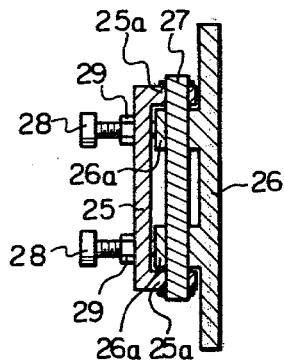
FIG. 3 is a cross-sectional view taken along the line III—III' in FIG. 2A.

FIG. 3 is a cross-sectional view taken along the line III—III' in FIG. 2A. The mounting plate 25 has a pair of bent portions 25a, while the mounting plate 26 has a pair of salient portions 26a which are located between the bent portions 25a. Both the bent portions 25a and the salient portions 26a have through-holes therein. The joint pin 27 is inserted into the through-holes so that the mounting plates 25 and 26 can be rotated with respect to the axis of the joint pin 27. The angle between the mounting plates 25 and 26 is adjusted by tightening or loosening the bolts 28. In this case, the bolts 28 which are locked by the nuts 29 abut against the mounting plate 26 through the threaded holes (not shown) of the mounting plate 25.

As explained hereinbefore, the automated device according to the present invention has the following advantages as compared with those of the invention of the prior art.

(1) The bending functional part of the automated device is of a construction which is small and simple because no complex mechanical parts such as gears, bearings, etc.; no electrical parts such as electric motors; and no control unit are contained in the bending functional part.

(2) The total cost of the automated device is relatively low because of the same reason as that mentioned in item 1, above.

What is claimed is:

1. An automated device for use in a numerically controlled machine tool system comprising: an arm; a wrist coupled to said arm wherein said wrist is rotatable to a plurality of predetermined angles with respect to said arm; and a hand rotatably coupled to said wrist, wherein said wrist includes a single means for coupling said wrist to said arm and for varying the angle of the axis of said wrist with respect to the axis of said arm, said coupling and varying means comprising a first mounting plate means having a pair of bent portions, a second mounting plate means having a pair of salient portions positioned between said bent portions, and pin means inserted through said bent portions and said salient portions for coupling said first and second mounting plate means and wherein said first mounting plate means and said second mounting plate means are rotatable with respect to each other about the axis of said pin means, and adjusting means contacting said first and second mounting plate means, for adjusting the angle of rotation of said first mounting plate means with respect to said second mounting plate means.

2. An automated device as set forth in claim 1, wherein said adjusting means includes at least one bolt positioned in and through a threaded hole of said first mounting plate means and abutting against said second mounting plate means.

3. An automated device as set forth in claim 1, wherein said wrist includes an actuator for rotating said hand with respect to the axis of said wrist.

* * * * *